US007124125B2

(12) United States Patent
Cook et al.

(10) Patent No.: US 7,124,125 B2
(45) Date of Patent: Oct. 17, 2006

(54) SYSTEM AND METHOD FOR PROVIDING MEDIA SAMPLES ON-LINE IN RESPONSE TO MEDIA RELATED SEARCHES ON THE INTERNET

(75) Inventors: David Cook, Irvine, CA (US); Kjersten Johansen, Tukwila, WA (US)

(73) Assignee: Loudeye Corp., Seattle, WA (US)

( * ) Notice: Subject to any disclaimer, the term of this patent is extended or adjusted under 35 U.S.C. 154(b) by 0 days.

(21) Appl. No.: 10/634,853

(22) Filed: Aug. 6, 2003

(65) Prior Publication Data

US 2004/0088328 A1    May 6, 2004

Related U.S. Application Data

(60) Provisional application No. 60/422,851, filed on Nov. 1, 2002.

(51) Int. Cl.
G06F 17/30 (2006.01)
(52) U.S. Cl. ................... 707/1; 707/10; 707/104.1
(58) Field of Classification Search .............. 707/1–10, 707/100, 104; 705/1, 14; 345/733, 765; 384/460, 462
See application file for complete search history.

(56) References Cited

U.S. PATENT DOCUMENTS

```
5,960,411  A  *  9/1999   Hartman et al. ............ 705/26
6,009,410  A  * 12/1999   LeMole et al. ............. 705/14
6,587,127  B1 *  7/2003   Leeke et al. ............... 345/765
6,611,812  B1 *  8/2003   Hurtado et al. ............ 705/26
6,917,961  B1 *  7/2005   Melet et al. ............... 709/203
2001/0051996 A1 * 12/2001 Cooper et al. ............. 709/217
2002/0013826 A1 *  1/2002 Hughes et al. ............. 709/219
2002/0052933 A1 *  5/2002 Leonhard et al. .......... 709/219
2002/0089534 A1 *  7/2002 Siekmann ................... 345/738
2004/0051812 A1 *  3/2004 Hayward .................... 348/460
```

OTHER PUBLICATIONS

Keith Hill. A Perspective: The Role of Identifiers in Managing and Protecting Intellectual Property in the Digital Age. IEEE 1999.*
PCT International Search Report PCT/US03/34499, Loudeye Corp.

* cited by examiner

*Primary Examiner*—Jeffrey Gaffin
*Assistant Examiner*—Neveen Abel-Jalil
(74) *Attorney, Agent, or Firm*—Pillsbury Winthrop Shaw Pittman LLP

(57) ABSTRACT

A method and system are described for providing a streamlined method for using, for example, streaming media samples to promote and sell music, videos and related merchandise on the Internet in response to searches for entertainment related information. When a consumer enters an Internet search query that includes a Media Keyword, a corresponding media sample or sample set is identified for the consumer to select to receive as a stream or download onto the Consumer Device, along with search results pertaining to the requested information and purchasing options. The media sample or sample set is provided as a link in a web page containing search results generated for the consumer. The media sample link may be indicated on the web page as a preferred, personalized or sponsored search result.

16 Claims, 10 Drawing Sheets

FIG. 3B

SEARCH RESULTS FOR: Mandy More

1. Mandy More
   Mandy More [Audio CD]
   *Release Date: June 19, 2001*
   PRICE: $12.99
   ♪ Listen!

2. I Wanna Be With You
   Mandy More [Audio CD]
   *Release Date: May 9, 2000*
   PRICE: $12.99
   ♪ Listen!

3. Now That's What I Call Music 4
   Backstreet Boys, et al [Audio CD]
   *Release Date: July 18, 2000*
   PRICE: $12.99
   ♪ Listen!

FIG. 4

| Keyword | Media Type | Sample Location | Priority | Conversion | Popularity |
|---|---|---|---|---|---|
| "Tina Turner" | Audio Set | media.le.com/12793... | 1 | 10 | 79635 |
| "Tina Turner" | Video Trailer | Media.le.com/16892... | 3 | 20 | 665 |

| Sample Location | UPC | Product_Type |
|---|---|---|
| media.le.com/12793... | 75678344121 | Physical CD |
| media.le.com/12793... | 75678020215 | Digital Song |
| media.le.com/16892... | 75678235615 | DVD |

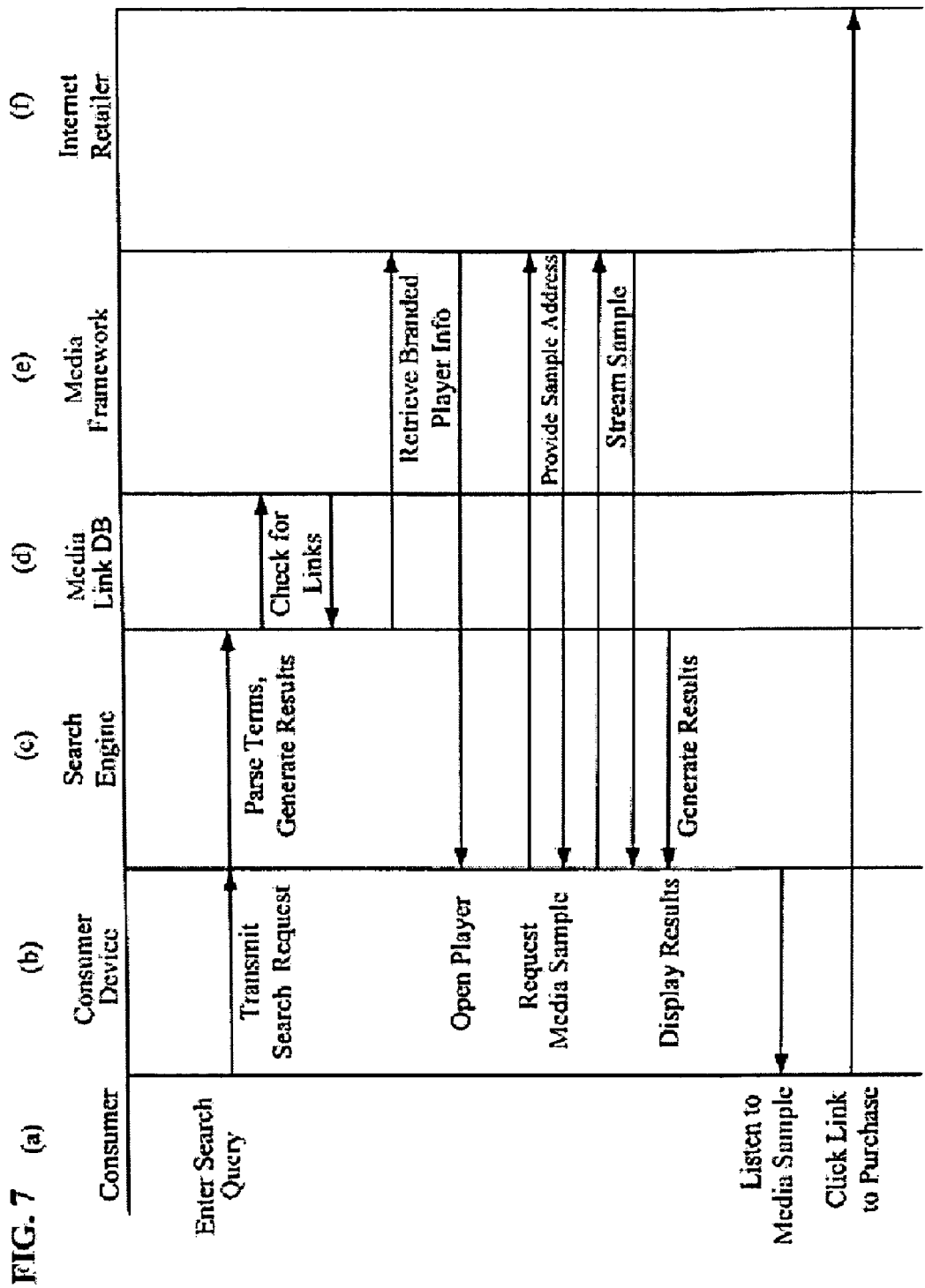

SYSTEM AND METHOD FOR PROVIDING MEDIA SAMPLES ON-LINE IN RESPONSE TO MEDIA RELATED SEARCHES ON THE INTERNET

This application claims the benefit of U.S. Provisional Application No. 60/422,851, filed Nov. 1, 2002, which is herein incorporated by reference in its entirety.

BACKGROUND

1. Field of the Invention

The present invention relates generally to consumer-based online digital media services, and more particularly, to the performance of music and video samples over the Internet in response to media related Internet searches made by consumers.

2. Background of the Invention

As the Internet becomes an increasingly accessible interactive medium for entertainment and merchandising, Internet web sites have become available that enable consumers to shop for and purchase music, videos and video games (media) online. Particularly, consumers can access any of several popular web sites to perform searches for desired performing artists, albums, songs, movies or games and then purchase media for delivery via mail-order or download. To provide an interactive multimedia experience, some web sites also enable consumers to preview sample of media products before purchase. These samples may include song clips from an artist or album, trailers from a video, and clips from a playing session of a video game. In this manner, media samples have proven to be a useful tool to encourage and assist consumers in selecting media to purchase online.

As an example, Internet music retailers presently include links to a music server to provide music samples to consumers while browsing their respective web sites. After a consumer performs a search for an album or musical artist on a music retailer's web site, the consumer can click on a link to preview one or more music samples for the chosen product. The link connects the consumer's computer with the music server, which has a database of music samples. The music server then looks through the database to find the sample desired by the consumer. As the sample is retrieved, the consumer's web browser is notified to automatically open the consumer's media player to play the sample. If the music server is provided by a third party, the music server provider ultimately determines billing information for the service based on which retailer provided the link to the consumer to retrieve the sample.

The provision of music samples by Internet music retailers demonstrates an effort to simulate or improve upon an atmosphere that consumers may encounter at a traditional media store. There is typically music or video playing in the background of a conventional record or movie store to encourage consumers to purchase media that is "on-sale" or is otherwise a "featured selection." If a record store has separate rooms for different genres of music, different types of music may be playing throughout the store that is correlated to the respective sections. For example, a jazz selection may be playing in the jazz section of the record store, while a classical selection may be playing simultaneously in the classical section. Additionally or alternatively, some music stores feature kiosks or "preview stations" through which customers can individually preview music samples from albums that are "on-sale" or are "featured selections."

While playing music in the background in record stores and providing music samples in kiosks or through Internet retailer web sites can be useful to encourage consumers to purchase music, there are certain inherent limitations that are associated with these services. For example, a record store cannot personalize the selection of songs played in the background to the particular tastes of the customers who are in the store at any given time. If consumers dislike the featured selections being played in the background and find the music to be distracting, this may actually discourage sales from those consumers.

Although kiosks and Internet web sites enable individual consumers to select media samples to preview, this does not occur until after the consumers perform searches for an artist and a corresponding album by that artist, or has located a video. In this manner, the provision of media samples is not being "pushed out" to encourage the consumers to listen, but is provided only after consumers choose a media samples from a product that they are considering for purchase. This process of searching can involve several steps that must be repeated for every media item the consumer considers. This creates a laborious purchasing atmosphere for the consumer, and reduces the opportunity for add-on sales for the retailer.

Furthermore, whether media samples are provided in stores or on consumers' computers while accessing Internet retailer web sites, consumers must first enter a retailing environment before being offered the opportunity to preview and purchase the media. This precludes opportunities for using media samples to lead consumers into purchasing decisions.

Accordingly, there is a need for a method and system for providing media samples online, which streamlines the consumer's ability to preview and purchase media products.

SUMMARY OF THE INVENTION

The present invention relates to a method and system for providing media samples over the Internet to consumers who perform media-related searches on Internet sites. When a consumer enters, for example, a name of a performing artist, album, movie or video game (Media Keyword) as a search query, the search engine identifies a media sample or sample set that the consumer can select to receive as a stream or download onto the consumer's Internet connected media device, which might take the form of, for example, a PC, cell phone, PDA, portable media player, or stereo component. The search results information also may provide an option for the consumer to immediately preview the media sample and purchase the physical and/or digital versions of the media product. Alternatively, the media sample or sample set may be automatically played on the consumer's Internet connected device (Consumer Device) while the consumer reviews other search results provided by the query. As additional embodiments, the sample may be automatically chosen for the consumer, and there may be an audio call-to-action statement appended to the sample(s).

BRIEF DESCRIPTION OF THE DRAWINGS

FIG. 3B is an illustration of a search results page, providing a link to a media sample.

FIG. 4 is an exemplary database schema for a links list in accordance with an embodiment of the present invention.

FIG. 7 is time line illustrating steps for searching for information on a search engine and automatically receiving a media sample performance, in accordance with an alternative embodiment of the present invention.

DETAILED DESCRIPTION OF THE INVENTION

A method and system are described for providing a streamlined method for using, for example, streaming media samples to promote and sell music, videos and related merchandise on the Internet in response to searches for entertainment related information. When a consumer enters an Internet search query that includes a Media Keyword, a corresponding media sample or sample set is identified for the consumer to select to receive as a stream or download onto the Consumer Device, along with search results pertaining to the requested information and purchasing options. The media sample or sample set is provided as a link in a web page containing search results generated for the consumer. The media sample link may be indicated on the web page as a preferred, personalized or sponsored search result.

Selecting the link to the media sample, will play the media sample(s) while the consumer is free to continue reviewing or accessing other search results. In accordance with a preferred embodiment, the media can be streamed or downloaded through a custom branded media player, which enables the consumer to purchase digital or physical media and may also provide searching features, recommendations, related product information, promotions or related product offerings.

As an alternative, the media sample may be automatically played on the Consumer Device while the consumer reviews the search results provided by the search query. In accordance with a preferred embodiment, the custom branded media player will be automatically launched to play the media sample and may also provide the search results from the search query.

As an additional embodiment, the music sample, or sample set is automatically selected. To promote add-on sales, a highlights sampling feature is an optional feature that uses the same criteria named above to automatically select and play a music sample from each item in the search results or recommendations display and allows the consumer to select or pass on each item.

As an additional embodiment, each media sample may be followed up with an audio call-to-action statement, which directs the consumer to perform an action.

Figure 1A:
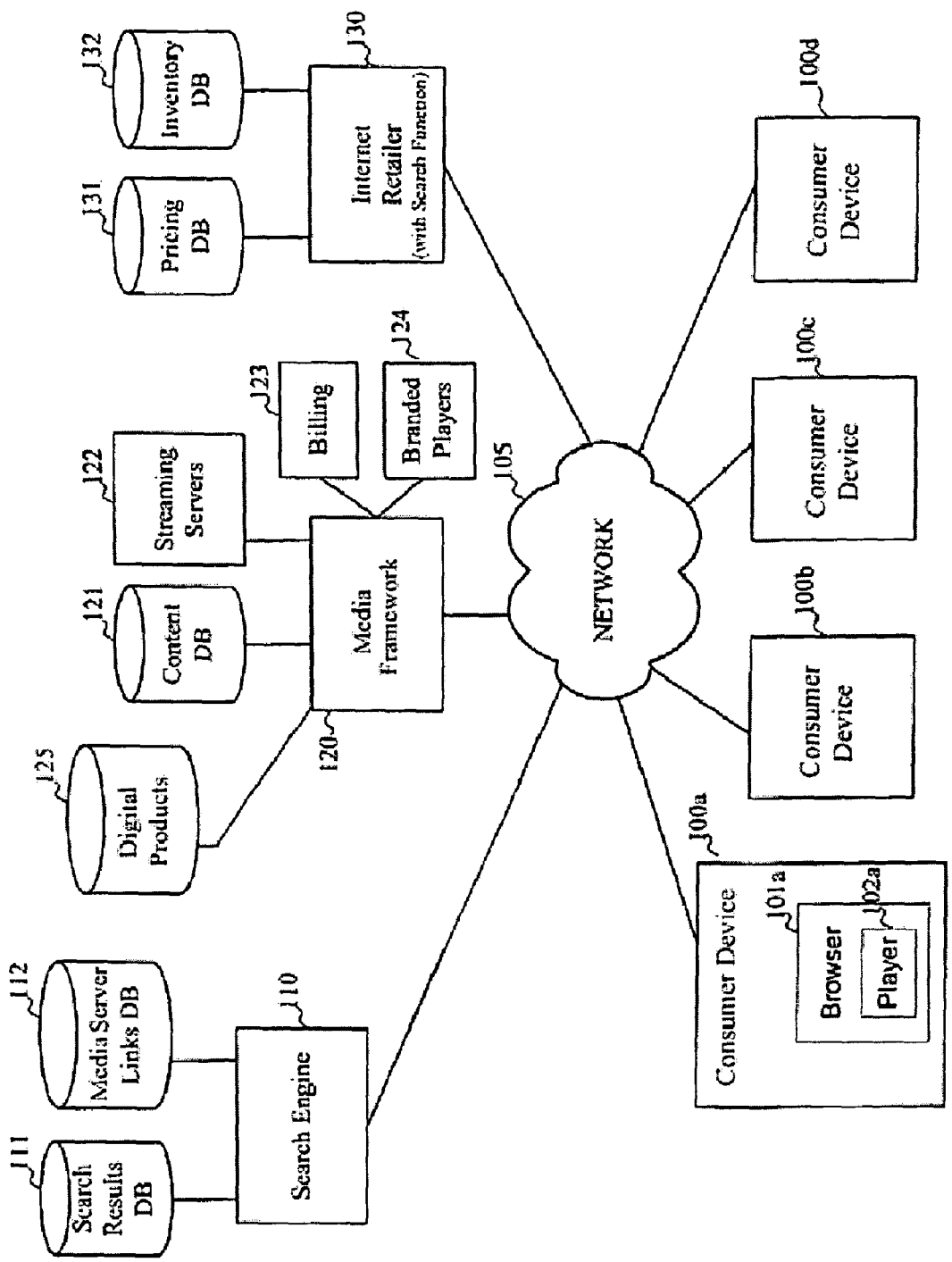
FIG. 1A is an exemplary schematic diagram of networked connections between consumers, a search engine web site, the media framework, and an Internet-based retailer, according to an embodiment of the present invention.

FIG. 1A is a schematic diagram illustrating networked connections between Consumer Devices 100a–100d, a search engine web site 110, the media framework 120, and an Internet-based retailer 130, according to an embodiment of the present invention. Consumers are connected to the network 105 via a Consumer Device 100a–d. As described above, the Consumer Device can be a PC, cell phone, PDA, portable media player, or stereo component, among Internet-enabled devices. A consumer receives network access by connection to the Internet in any number of known ways, such as through use of an Internet service provider (not shown). Upon connecting to an on-line network, a consumer can access a search engine web page 110. Typically, consumers perform searches on search engines by providing keywords or phrases, which trigger a search for web pages or other information responsive to the search query.

Search engines are typically comprised of a series of databases containing information pertaining to web sites that can be accessed over the World Wide Web. A search engine may operate by means of a "spider," which is a software robot that "crawls" through the Internet to gather the information to be stored in the databases. Meta tags may be used to index sites by specifying key words and concepts under which the page is intended to be indexed. Spiders can then correlate meta tags with page content and reject meta tags that do not match the words provided in a search query.

Search engines employ different methods for extracting, indexing, and displaying information. Many search engines display results in an order based upon relevancy, and a clip of text from the web site may be provided in the search results along with the URL for the respective site. Search engines may also display listings for "preferred" web sites, which may be prominently displayed if a "preferred" web site has entered a sponsorship agreement with the search engine provider.

In accordance with the schematic diagram of FIG. 1A, when a search query provided by a consumer includes a Media Keyword, such as an artist's name or an album or video name, the search engine identifies a media sample(s) from database 112 relating to the Media Keyword in addition to search results from database 111. The consumer can then select to preview the media sample(s). This causes the browser 101a at the client computer to contact the media framework 120. The media framework 120 begins communication between one of a plurality of streaming servers 122 and a media player 102a on the Consumer Device. The identified media sample(s) are retrieved from content database 121 and are streamed from a server 122 to the media player 102a on the Consumer Device. While the media is played, the consumer is provided an option to purchase the media from an Internet retailer 130. If the media server system is operated by a third party, a log record is created in billing database 123 to charge a fee to search engine 110, accounting for the playback of the sample to the search engine's customer.

Figure 1B:
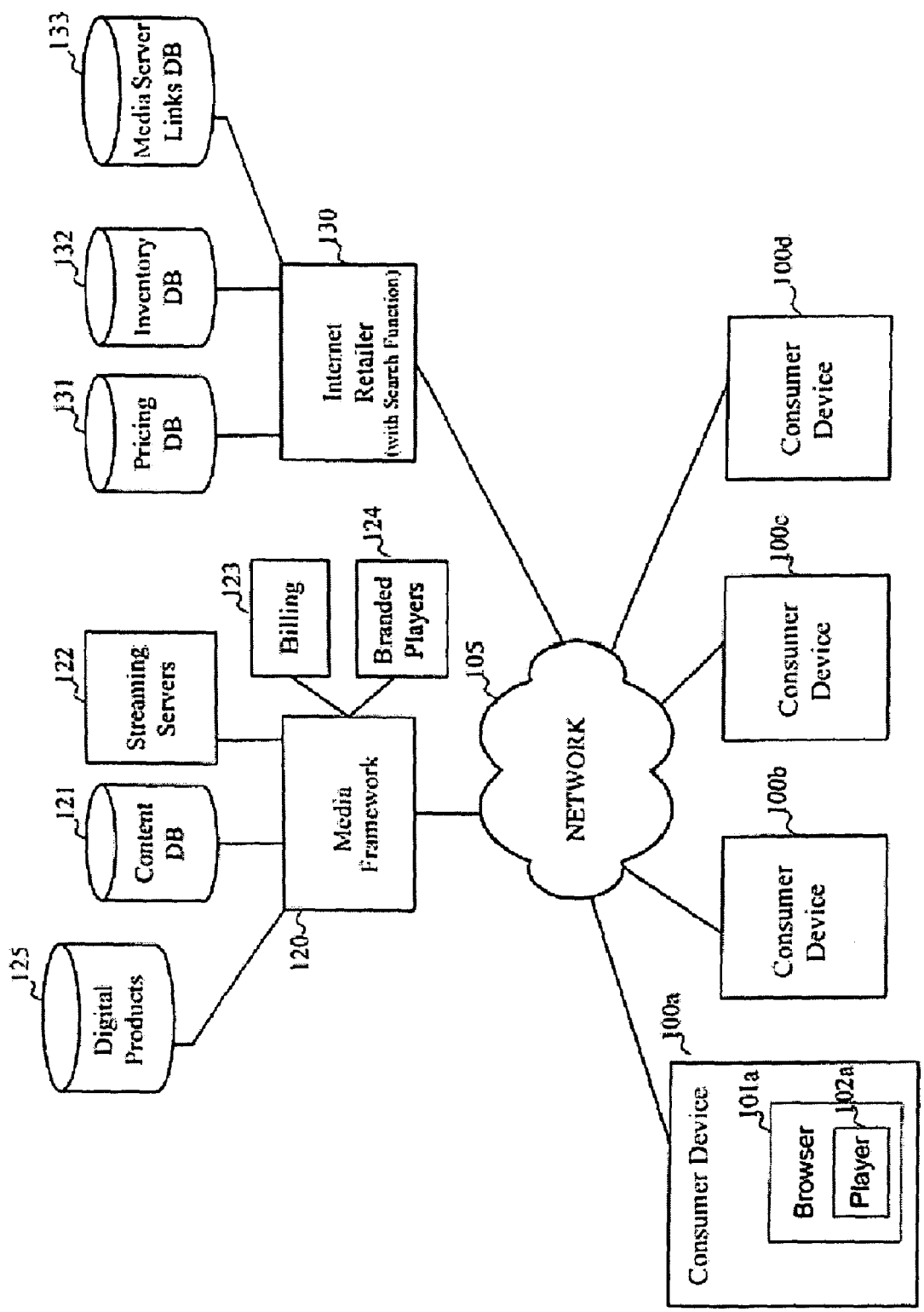
FIG. 1B is an exemplary schematic diagram of networked connections between consumers, an Internet-based retailer with its own search engine, and the media framework, according to an embodiment of the present invention.

FIG. 1B is a schematic diagram illustrating networked connections between Consumer Device, a media server, and an Internet-based retailer with a search engine according to an embodiment of the present invention. As in FIG. 1A, consumers are connected to the network 105 via a Consumer Device 100*a*–*d*. Upon connecting to an on-line network, a consumer can access an Internet-based retailer with a search engine web page 130.

In accordance with the schematic diagram of FIG. 1B, when a search query provided by a consumer includes a Media Keyword, the Internet retailer's search engine identifies a media sample(s) from database 133 relating to the Media Keyword(s), in addition to their inventory from database 132. The consumer can then select to preview the media sample(s). This causes the browser 101*a* at the Consumer Device to contact the media framework 120. The media framework 120 begins communication between one of a plurality of streaming servers 122 (in a media streaming system) and a media player 102*a* on the Consumer Device. The identified media sample(s) are retrieved from content database 121 and are streamed from a server 122 to the media player 102*a* on the Consumer Device. While the media is played, the consumer is provided an option to purchase media from an Internet retailer 130. If the media server links DB 133 is operated by a third party, a log record is created in billing database 123 to charge a fee to search engine 110, accounting for the playback of the sample to the retailer's customer.

Figure 2A:
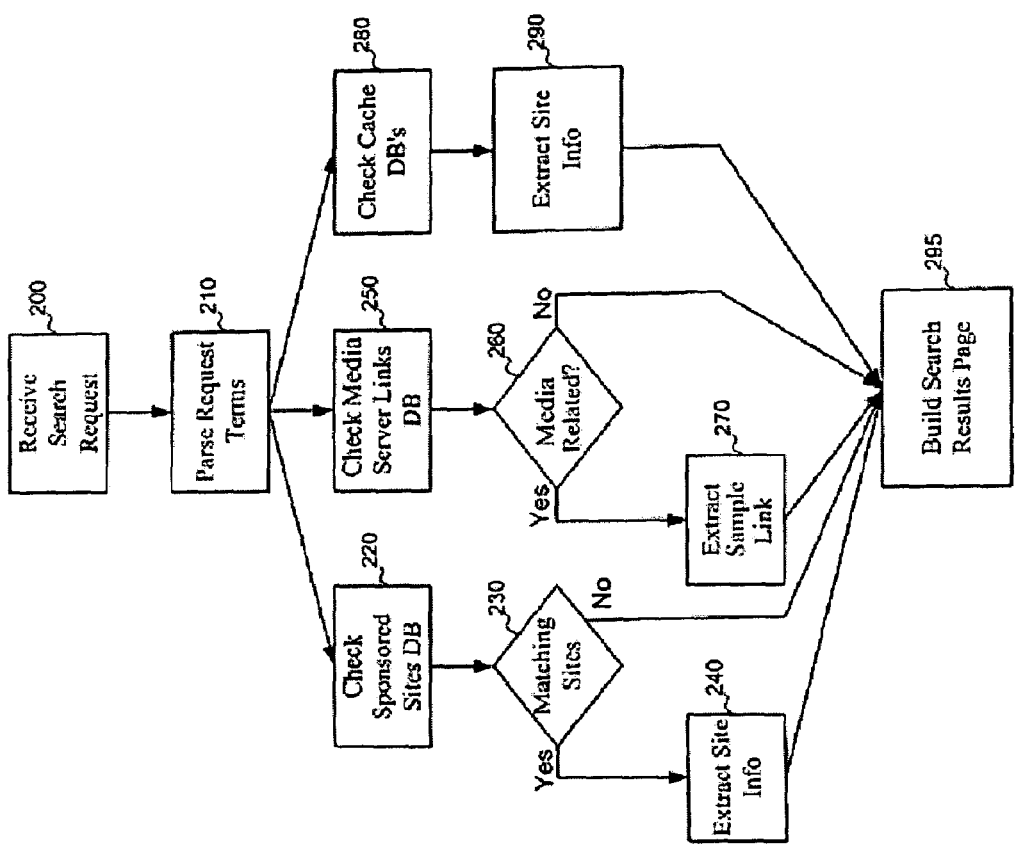
FIG. 2A is a flow diagram illustrating a method for retrieving media samples in response to a search request on a search engine, in accordance with an embodiment of the present invention.

FIG. 2A is a flow diagram illustrating steps by which a search engine generates a search results page in response to a search request by a consumer, in accordance with an embodiment of the present invention. A search request is received from a consumer on a search engine, in step 200. Depending upon the configuration of the search engine, the request may be in any of various formats, such as a word or phrase, a sentence, a set of Boolean terms, or a question. The words in the request are then parsed in step 210 into a set (one or more) of keywords to be applied to a series of databases, as is known. The process of applying the keywords to databases is shown in steps 220, 250, and 280. For example, step of applying the keywords to cache databases for links to relevant web sites (step 280) is performed by a conventional search engine. Although steps 220, 250, and 280 are illustrated as occurring simultaneously, these may occur in any order.

In step 220, the keywords are applied to one or more databases, illustrated as "sponsored sites," which contain information that is associated or affiliated with the search engine provider, possibly as part of a sponsorship agreement. If any web site(s) or other information in the "sponsored sites" databases is determined to be applicable in step 230, the site information is extracted in step 240 to be presented to the consumer. As an example, if a consumer types "skiing" as a search query, and a Colorado ski resort has a sponsorship agreement, the ski resort's web site may be positioned or highlighted in the display of search results to receive consumers' attention.

In step 250, which may occur before, after, or simultaneously with step 220 (and may occur as a component within step 220), a media server links database is checked to determine whether any of the key words in the search request pertain to music-related information. For example, if a consumer's search request includes the name of a performing artist, as determined in step 260, and this information is contained in the media server links database, then the media sample(s) designated for that performing artist are extracted and provided as part of the search results shown in step 270. An exact matching may be required for some entries to prevent or at least reduce the instances of false hits (i.e., so that the request "Japanese beatles" will not trigger information for the band "The Beatles," while the term "Springsteen" will trigger "Bruce Springsteen"). The contents of the music server links database and a method for updating the database will be described below with reference to FIG. 4.

In step 280, the search engine performs a search in the conventional manner for site information pertaining to the keywords in the search query, whether by "spiders," "meta tags," etc. As described above, it is anticipated that this search will be within a series of cache databases storing site information for a frequently requested information.

Figure 2B:
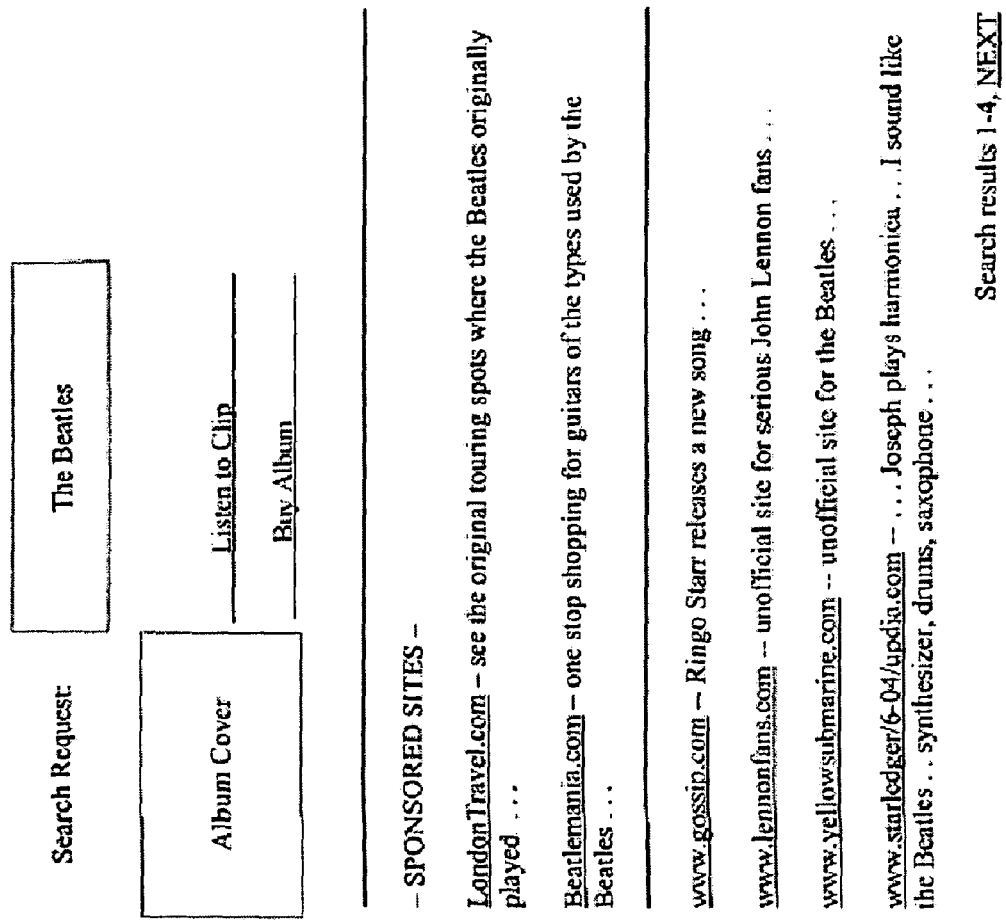
FIG. 2B is an illustration of a search results page, providing a link to a media sample along with a list of web site containing information relating to a search query, in accordance with an embodiment of the present invention.

Once the sponsored web site information, media sample links, and web site links are assembled, the search engine generates a search results page in step 295 to provide to the consumer. FIG. 2B illustrates an exemplary search results page for a search for "The Beatles." As can be seen, an album cover, purchase options and a link to preview a music sample from the band, "The Beatles," appears first as a primary search result. Under this is a list of "sponsored sites," each of which presumably has paid a fee to appear on the search results page. After the "sponsored sites," a list of search results for unsponsored web sites is provided, each with accompanying text excerpts from the respective web site.

Figure 3A:
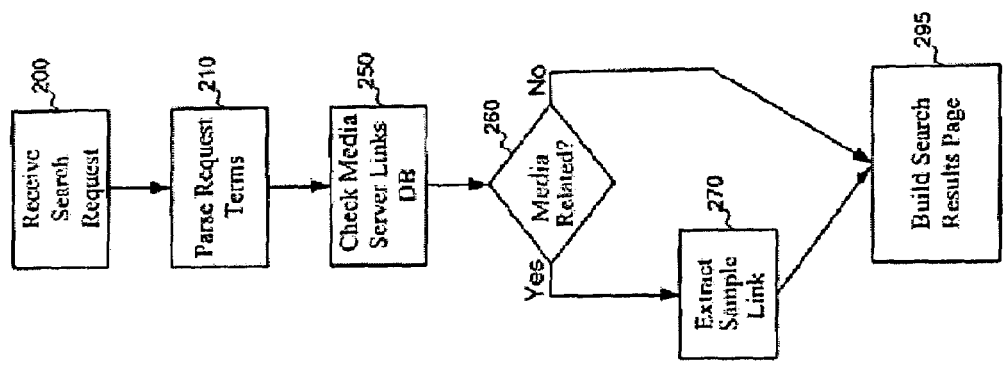
FIG. 3A is a flow diagram illustrating a method for retrieving media samples in response to a search request on an Internet retailer's search, in accordance with an embodiment of the present invention.

FIG. 3A is a flow diagram illustrating steps by which an Internet retailer with a search engine generates a search results page in response to a search request by a consumer, in accordance with an embodiment of the present invention. A search request is received from a consumer on a search engine, in step 200. Depending upon the configuration of the search engine, the request may be in any of various formats, such as a word or phrase, a sentence, a set of Boolean terms, or a question. The terms in the request are then parsed in step 210 into a set (one or more) of keywords to be applied to a series of databases, as is known. In step 250, a media server links database is checked to determine whether any of the key words in the search request pertain to media-related information. For example, if a consumer's search request includes the name of a performing artist and this information is contained in the media server links database, then a media sample for that performing artist is extracted and provided as part of the search results shown in FIG. 3B.

FIG. 3B illustrates an exemplary search results display from an Internet retailer for a search for "Mandy More." As can be seen, a listing of album covers and links to listen to a music sample from three different albums is presented. The price of the albums and other purchasing information (along with an option to click on the price icon to purchase an album) also is presented.

FIG. 4 provides an excerpt of an exemplary database schema for the media server links DB 112 and 133 from FIGS. 1A and 1B. This database is replicated from information stored and provided by the Content DB 121 in the media framework 120. The media server links DB 112 and 133 databases store, for example, "Keywords", "Media_Types", "Sample_Locations", "UPC", "Priority", "Popularity", "Product_Types" and "Conversions."

"Keywords" are the values entered by the consumers into the search engine, including such words as the name of a performing artist or artist group, an album name, a movie name, a song name or video game name. Each media sample that is linked to a Media Keyword is identified with a "Media_Type" indicator which includes, but is not limited to, the following types: Game Trailer, Game Sample, Audio Promo, Audio Set, Audio Sample, Video Promo, and Video Trailer. This allows the search results to properly identify the type of media sample being provided with each link.

Each media sample or sample set that is associated with a "Keyword" has a unique "Sample_Location." Each "Sample_Location" is a unique link that contains the web address for the unique "Sample_ID" number for the media sample(s).

Each "Keyword"/"Media Type"/"Sample_Location" record also may be further described with a "Priority", "Conversion" and "Popularity" field that allows similar Media Types tied to the same Keyword to be ranked in order of importance for display by the search engine. The "Priority" can be set according to a variety of criteria, such as: (i) the most recent release from the artist as tracked by the Content DB 121; (ii) a release selected by the record label or the artist; or (iii) a preferred selection from the search engine provider. The "Conversion" field contains the probability that this media sample will lead to a conversion measured either as a sale or an add to shopping cart, metrics that are tracked described below. The "Popularity" field contains a numeric of the number of requests for this media sample over time.

The media server links database in the exemplary database schema also provides a list of the "UPCs for media products associated with each media sample to provide a direct link between listed and purchase, and a "Product Type" which describes the product that can be purchased, for example: "physical CD", "digital song", etc.

When a consumer clicks on a link within a web browser, an instruction is transmitted over the Internet for the media framework to retrieve a metafile containing the location of the media file corresponding to the "Sample_ID," and to provide instructions for the consumer's web browser to launch the media player to play the sample. A valid "Client_ID" is inserted into the request sent to the media framework that identifies the entity charged for the cost of providing the media sample. This can be used for billing purposes, such that the media framework can invoice the search engine (such as Internet Retailer 130) for each referral. The "Client_ID" number can also be used to identify the "branded player" that should be launched on the Consumer Device to play the sample, as will be explained below in greater detail.

The entries for the media server links database 112 and 133 can be downloaded from the media framework in batch format at regular intervals (daily, weekly, monthly, etc.). In addition, using the UPC code for a media product, the media sample can be dynamically requested from the media framework 120 at any time.

The "Conversion" field is calculated by aggregating data collected from various sources and sent to the media framework 120 including (i) from instrumentation on the branded player (described below) that reports the media samples played, the products added to the shopping cart, and the products purchased in each transaction; or (ii) from notifications provided by Internet retailers whenever a media purchase is made subsequent to provision of a media sample.

As an additional embodiment of the present invention, the media player used by the Consumer Device to play back a media sample in response to the consumer's search request can be customized to show the "branding" of the business providing the service, usually a search engine or the Internet retailer. As shown in FIGS. 1A and 1B, element 124, the media framework 120 contains a database of "branded players." In accordance with an embodiment of the present invention, a "branded player" is a visual interface that appears to the consumer as if the player is designed for a particular sponsor.

Figure 5:
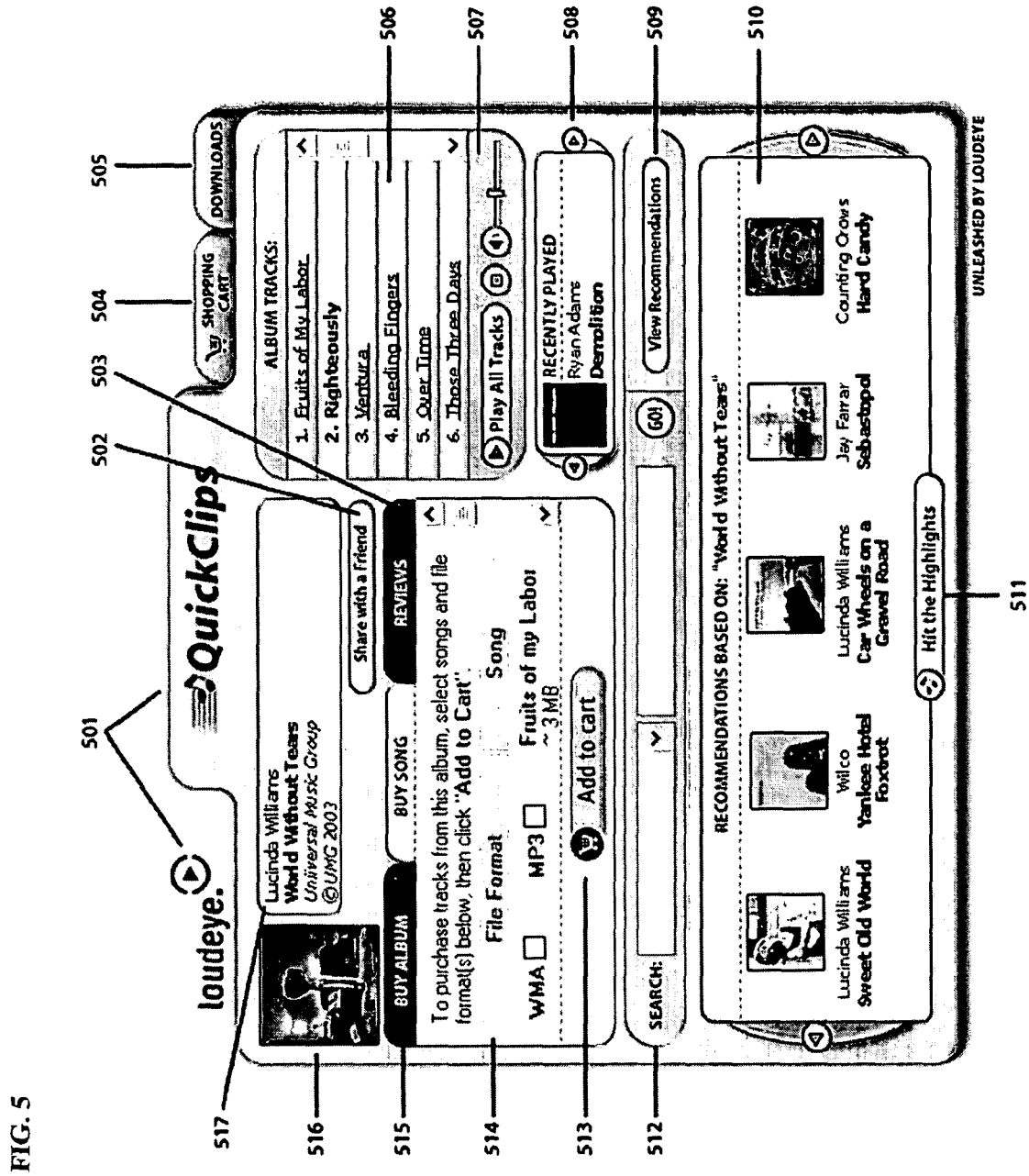
FIG. 5 is an illustration of an exemplary branded media player, in accordance with an alternative embodiment of the present invention.

FIG. 5 provides an example of a branded player (QuickClips) for an Internet retailer with their own search engine. Even though the format for a media player on a Consumer Device is typically provided by one of a few sources, such as Microsoft Windows Media™ or Real Networks, the display interface of the media player on the Consumer Device display can be "branded" with the logo and color scheme for the business offering the service. QuickClips is a customer branded player interface that can be customized with colors, logos, buttons and other graphic elements in use on the customer's web site to keep the user experience in the context of the customer's brand. In the example of FIG. 5, the player is "branded" 501 for "Loudeye.com," and the surrounding colors and design reflect their branded imaging.

The "branded player" is an application that is built on top of the media framework 120 that allows a business interested in selling digital media, or using digital media to sell other products to rapidly provide a customized and highly scalable solution. The purpose of this "branded player" is to show how one set of features offered through the media framework 120 can be combined into an interface to provide a listening-centric music purchasing experience that will increase CD sales, single song sales, or a combination of both for an online music retailer. These features are reused to create interfaces for selling video games or movies, or a combination of these types of products. The features described in FIG. 5 can be either integrated into the customer's current e-commerce application directly from the media framework 120, or provided in an interface such as the "branded player"

The "branded player" is available from a link on a search results page, or can be automatically launched as the result of a search query. The "branded player" is automatically generated for the Consumer Device when the consumer clicks on a link to hear a sample. Upon retrieving the "Client_ID" data from the link, the media framework checks "branded players" database 124 to determine whether a branded player is available for this client. If so, the branded player data is quickly downloaded to the consumer's browser and utilized as an interface to the media player installed on the Consumer Device (e.g., Windows Media™ or RealAudio™).

When the consumer chooses the "Listen link" from the search results page FIG. 3B, the "branded player" is launched displaying a graphic of the product 516, and product information 516 such as artist name, album name, releasing label and copyright information. Media sampling is provided through the control 517, which for music sales, includes a track listing for the chosen title as well as "player controls", 507 such as "volume," "stop," and "mute." Specifically for listening to album samples, there is a "Play All Tracks" control that lets you play a sample from each track in the album.

The player is designed to take advantage of the audio samples and automatically receives a playlist of the top 3 most popular songs on the album and plays them in succession, indicating with a highlight and animated icon which song shown in the track listing is playing. This feature is customizable for each implementation as to the number of samples that are automatically played. Selection of the top 3 tracks is based upon one or more of the following criteria: a dynamically-performed analysis to determine which song by the artist receives the most "click-throughs" by consumers to sample or purchase music; popularity data; personalized recommendation data provided by consumer opt-in data collection.

If the consumer does not interrupt the playlist, by selecting a specific track to preview, the playlist will complete with an audio clip that provides a "call-to-action" for the consumer to press the "Add to Shopping Cart" button 513.

The call-to-action statements can take the following forms: a branded statement from the on-line business providing the consumer interface that directs the user to take action; a generic statement that directs the user to take action; a promotional figure (such as a performing artist) that directs the user to take action either generically or on behalf of the online business offering the media products for sale.

The "branded player" is designed to take advantage the digital distribution service 125 in the media framework that allows digital products to be sold and delivered over the Internet. The "Buy Album" 515 and "Buy Song" 514 tabs contain the pricing and format information necessary to select a either a physical or digital format of the product and add it to the shopping cart. Additional product information can be provided in the "Reviews" 503 tab, this is customizable to integrate with the customer's established e-commerce offering or can be fulfilled with data available from the media framework.

The "branded player" includes a shopping cart tab 504 that can be integrated with the customer's e-commerce application or can be provided through the media framework 120. If digital versions of the product are also made available for sale, the "branded player" provides a "Downloads" tab 505 that provides the links to the digital downloads once the purchase transaction is completed.

The "media discovery" control 510 shows a set of product selections by displaying the cover art, artist name and album title. The "View Recommendations" button 509 fills the "media discovery" control with recommendations based on the selected product, or based on promotional campaigns. The search feature 512 is integrated in the "branded player" so that search results are displayed in the "music discovery" control 510. The "View Recommendations" button 509 is a toggle that changes to "View Search Results" when recommendations are showing. When pressed, this will toggle the "media discovery" control to show the last search results the consumer requested.

When the consumer adds a selection to their shopping cart, another audio call-to-action will prompt the consumer to press the "Hit the Highlights" button 511 to get recommendations for add-on purchases. The "Hit the Highlights" button is at the bottom of the "media discovery" control 510. When pressed, the "Hit the Highlights" button 511 will begin playing samples by cycling through the products displayed in the music discovery control, highlighting each product, and automatically playing the most popular sample from each product. If the consumer is not interested previewing the entire sample, they can press the "Skip to Next" button (not shown). If they are interested in one of the products, they can select the product graphic or name and the selection will display in the top part of the player and will continue to play through top 3 most popular samples and then play the audio "call to action."

Other options on the "branded player" include a "recently played" control 508 that allows the consumer to move backward and forwards through their product selections if desired.

The "branded player" takes advantage of viral marketing with the "Share with a Friend" button 502. This button pops up a form that requests email address and allows the consumer to enter a message. The email is sent with a link to the player that contains the context of the album the consumer has selected. The email link will activate the same "branded player" with the same product selection and begin playing the top 3 songs in the playlist, using the audio call-to-action to add the selection to the shopping cart. This makes the "branded player" a vehicle for customer acquisition, propagation of brand and an enhanced community for media purchasing.

Figure 6:
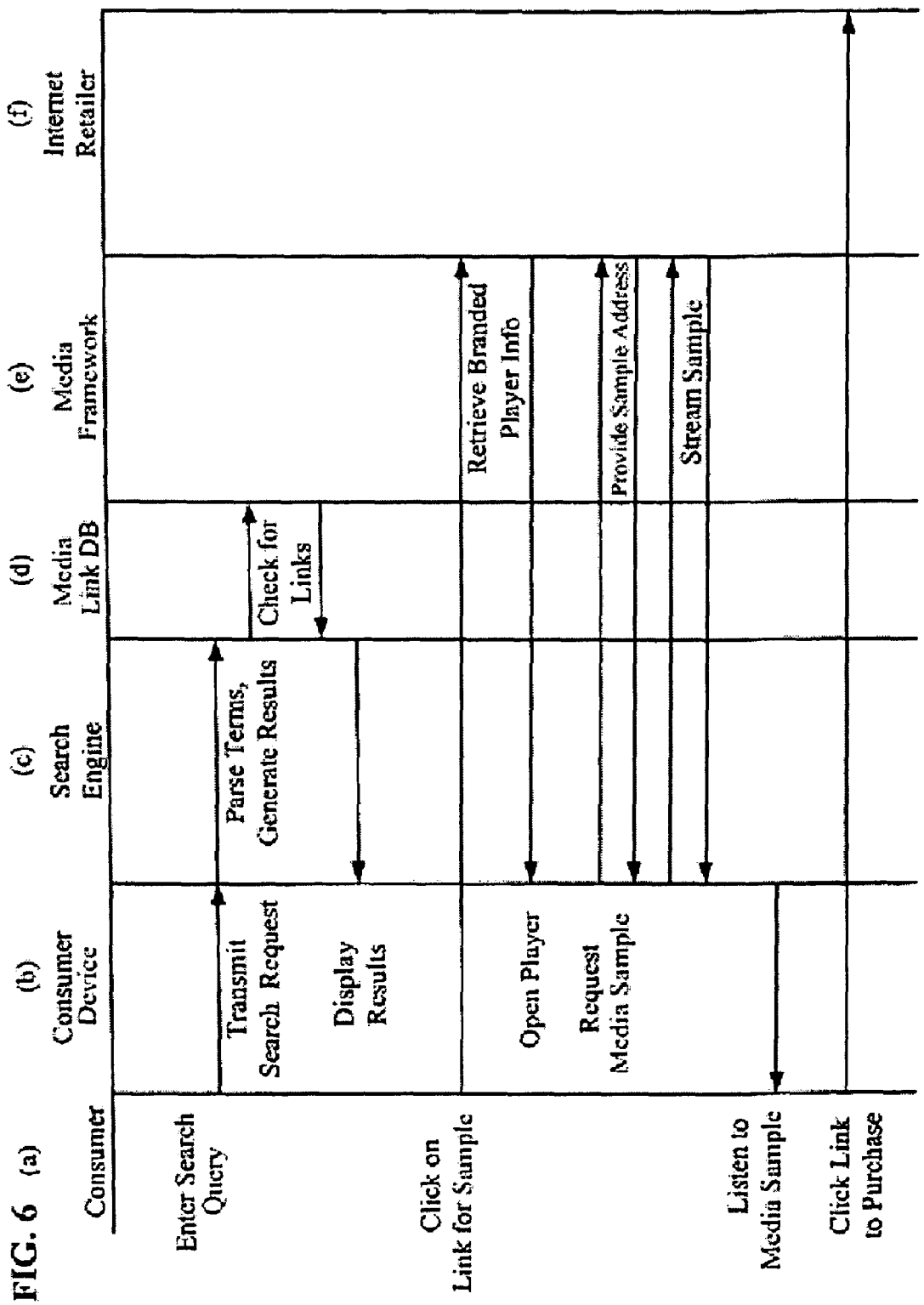
FIG. 6 is a time line illustrating steps for searching for information on a search engine and receiving a link to perform a media sample, in accordance with an embodiment of the present invention.

FIG. 6 provides a timing diagram of the steps that are to be performed by a consumer (a), the Consumer Device (b), a search engine web site (c), a media link database associated with the search engine (d), the media framework (e), and an Internet retailer (f). Once a consumer accesses a search engine web site and enters a search query, the consumer's computer transmits the request to the web server for the search engine, which in turn parses the request, as described in FIG. 2. Keywords in the search request are checked in a media links database to determine whether any media samples are can be included in the search results page. The server for the search engine generates search results to be displayed at the consumer's computer.

If the search results include a media sample (identified in media server links DB 112 in FIG. 1), and the consumer is interested in previewing the sample, the consumer clicks on a link provided in the search engine web page, which sends a request to the media framework 120 for the clip. The request checks the "Client_ID to determine if a "branded player" should be displayed when the media player is automatically opened on the Consumer Device. The specific address for a clip is looked up in content DB 121, is streamed to the Consumer Device from servers 122 to enable the consumer to listen to the sample. At any point during the preview of the sample, the consumer can add the product to a shopping cart through either the "Add to Cart" Button 513 in FIG. 5, on the "branded player" or through a link provided on the search results web page. The information about the name of the album that the consumer was listening to is automatically provided to the Internet retailer to facilitate a simple purchase transaction for the consumer, through databases 131 and 132.

Thus, as can be seen in FIG. 6, the consumer can request to listen to a media sample that was identified from the search query, and is then provided an opportunity to purchase the media during or after the preview of the sample.

As an alternative embodiment of the present invention, the identified sample that is found in the media link database can be automatically "pushed," or played on the Consumer Device. In this manner, the consumer who is searching for media-related information is automatically provided a media sample to enjoy while reviewing the requested search results. Along with the media sample, the consumer is also then provided an opportunity to purchase various formats of the associated product.

FIG. 7 provides a timing diagram for an alternative embodiment when media is automatically played for the consumer. As can be seen, if the search engine locates a sample in the media database, a request is generated and sent to the media framework to retrieve the media clip. This can be done by sending an instruction from the search engine to the Consumer Device to link from the search engine web site to the media framework. In the diagram of FIG. 6, the request is made directly from the search engine, which provides the consumer's IP address information to the media framework. Using the IP address, the media framework can then send a response to the Consumer Device. The remaining steps occur in the same manner as in FIG. 6, as the sample is retrieved and streamed to the Consumer Device for the consumer to preview.

The foregoing disclosure of the preferred embodiments of the present invention has been presented for purposes of illustration and description. It is not intended to be exhaustive or to limit the invention to the precise forms disclosed.

Many variations and modifications of the embodiments described herein will be apparent to one of ordinary skill in the art in light of the above disclosure.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations.

What is claimed is:

1. A system for providing media samples within search engine results pages, comprising:
    a plurality of internet-connected consumer devices for transmitting search requests online, the consumer devices including media players;
    a search engine for receiving consumer search requests from the consumer devices, wherein the search engine receives a search request from one of the consumer devices, wherein the search request comprises a keyword, and wherein the search engine searches afirst database comprising unsponsored websites for information pertaining to the keyword and a second database comprising media server links for music-related information pertaining to the keyword;
    a media framework for retrieving an identified media sample selected by a consumer and for providing the identified media sample to the consumer device for playback on a media player associated with the consumer devise; and
    an Internet retailer for purchasing a media product comprising the identified media sample,
    wherein the media server links of the second database comprise one or more a first link to the identified media sample on the media framework and a second link to the media product on the Internet retailer,
    wherein if the keyword matches information pertaining to an unsponsored website that is in the first database the search engine places a third link to the unsponsored website on a results page of the search engine,
    wherein if the keyword matches information pertaining to music-related server links that is in the second database the search engine places one or more of the first link and the second link on the results page of the search engine, and
    wherein the consumer search request includes a client ID that identifies a branded player that should be launched to playback the identified media sample, and wherein according to the client ID, the media framework further downloads the branded player that is associated with the identified media sample so that the media player associated with the consumer device playbacks the identified media sample on the branded player.

2. The system of claim 1, wherein the search engine provides a link to the consumer device to access the identified media sample from the media framework, and
    wherein the media framework maintains reports of identity of the search engine that referred the consumer to the media framework, for billing the search engine for provision of the identified media sample to the consumer.

3. The system of claim 1, wherein the branded player is associated with the Internet retailer.

4. A system for providing media samples within search engine results pages, comprising:
    a plurality of internet-connected consumer devices for transmitting search requests online, the consumer devices including media players;
    a search engine for receiving consumer search requests from the consumer devices, wherein the search engine receives a search request from one of the consumer devices, wherein the search request comprises a keyword, and wherein the search engine searches a first database comprising unsponsored websites for information pertaining to the keyword and a second database comprising media server links for music-related information pertaining to the keyword;
    a media framework for retrieving the identified media sample and for providing the identified media sample to the consumer device for automatic playback on a media player associated with the consumer device; and
    an Internet retailer for purchasing a media product comprising the identified media sample,
    wherein the media server links of the second database comprise one or more a first link to the identified media sample on the media framework and a second link to the media product on the Internet retailer,
    wherein if the keyword matches information pertaining to an unsponsored website that is in the first database the search engine places a third link to the unsponsored website on a results page of the search engine,
    wherein if the keyword matches information pertaining to music-related server links that is in the second database the search engine places one or more of the first link and the second link on the results page of the search engine, and
    wherein the consumer search request includes a client ID that identifies the branded player that should be launched to playback the identified media sample, and wherein according to the client ID, the media framework further downloads the branded player that is associated with the identified media sample so that the media player associated with the consumer device playbacks the identified media sample on the branded player.

5. The system of claim 4, wherein the identified media sample includes a call to action message.

6. A method for providing media samples within search engine results pages, comprising:
    receiving a search request comprising a keyword;
    searching a first database comprising unsponsored websites for information pertaining to the keyword;
    searching a second database comprising media server links for music-related information pertaining to the keyword,
    wherein the media server links of the second database comprise one or more of a first link to an identified media sample on a media framework and a second link to a media product on an Internet retailer,
    wherein the media product comprises the identified media sample,
    wherein if the keyword matches information pertaining to an unsponsored website that is in the first database the search engine places a third link to the unsponsored website on a results page; and
    wherein if the keyword matches information pertaining to music-related server links that is in the second database the search engine places one or more of the first link and the second link on the results page:

in response to a selection of the first link on the results page, providing the identified media sample from the media framework to enable playback on a media device, and downloading the identified media sample from the media framework through a branded player to enable playback of the identified media sample when the identified media sample is associated with the branded player, wherein the request further includes a client-ID that identifies the branded player that should be launched to playback the identified media sample, and wherein the branded player enables a consumer to listen to the playback of the identified media sample and purchase the media product, while reviewing and accessing other search results and related information.

7. The method of claim 6, wherein a consumer is enabled to access other search results during playback of the identified media sample.

8. The method of claim 6, further comprising including a call-to-action statement during playback of the identified media sample.

9. The method of claim 6, wherein the media device plays the identified media sample on the branded player that is associated with the Internet retailer.

10. The method of claim 9, wherein the branded player provides a fourth link to a consumer to purchase media that corresponds to the identified media sample.

11. A method for providing media samples within search engine results pages, comprising:

receiving a search request comprising a keyword and a client ID from a consumer device;

searching a first database comprising unsponsored websites for information pertaining to the keyword;

searching a second database comprising media server links for music-related information pertaining to the keyword, wherein the media server links of the second database comprise one or more of a first link to a media sample on a media framework and a second link to a media product on an Internet retailer, wherein the media product comprises the media sample, wherein if the keyword matches information pertaining to an unsponsored website that is in the first database the search engine places a third link to the unsponsored website on a results page, and wherein if the keyword matches information pertaining to music-related server links that is in the second database the search engine places one or more of the first link and the second link on the results page; and automatically providing the first link to the consumer device if the keyword matches information pertaining to music-related server links that is in the second database, wherein the media sample is automatically played on a media player associated with the consumer device, and wherein a branded player associated with the client ID and the media sample is automatically provided so that the media player plays back the media sample on the branded player.

12. The method of claim 11, wherein at least one search result is identified to the consumer device, and the consumer device is enabled to access the search result during playback of the media sample.

13. The method of claim 11, wherein a consumer is enabled to access other search results during playback of the media sample.

14. The method of claim 11, further comprising including a call-to-action statement during playback of the media sample.

15. The method of claim 11, wherein the branded player is associated with the Internet retailer.

16. The method of claim 9, wherein the branded player provides a fourth link to a consumer to purchase media that corresponds to the media sample.

* * * * *